United States Patent [19]
Compton et al.

[11] 3,812,577
[45] May 28, 1974

[54] ARMATURE WINDING METHOD AND APPARATUS

[75] Inventors: Jerry L. Compton; David R. Seitz, both of Dayton, Ohio

[73] Assignee: The Globe Tool and Engineering Company, Dayton, Ohio

[22] Filed: Mar. 13, 1973

[21] Appl. No.: 340,685

[52] U.S. Cl. ............ 29/597, 29/205 C, 29/205 CM, 29/598, 242/7.03, 242/7.05 B
[51] Int. Cl. .......................................... H01r 43/00
[58] Field of Search .. 29/597, 598, 205 C, 205 CM, 29/205 R; 310/234; 242/7.03, 7.05 R, 7.05 B, 7.05 C

[56] References Cited
UNITED STATES PATENTS

| 3,713,209 | 1/1973 | Biddison | 29/597 |
| 3,785,034 | 1/1974 | Bucholtz | 29/205 C |
| 3,628,229 | 12/1971 | Biddison et al. | 29/205 C |
| 3,713,208 | 1/1973 | Doyle | 29/597 |

*Primary Examiner*—Charles W. Lanham
*Assistant Examiner*—Carl E. Hall
*Attorney, Agent, or Firm*—Dybvig & Dybvig

[57] ABSTRACT

The lead wires of an armature wound by the fliers of a double flier armature winding machine are gripped by clamps engaging the wires between the commutator tangs and the fliers. The wires are severed against the commutator tangs by relative movement of the clamps and the armature. Both the start and finish wires can be severed in this manner and a movable clamp construction is illustrated especially for severing the start wires.

12 Claims, 13 Drawing Figures

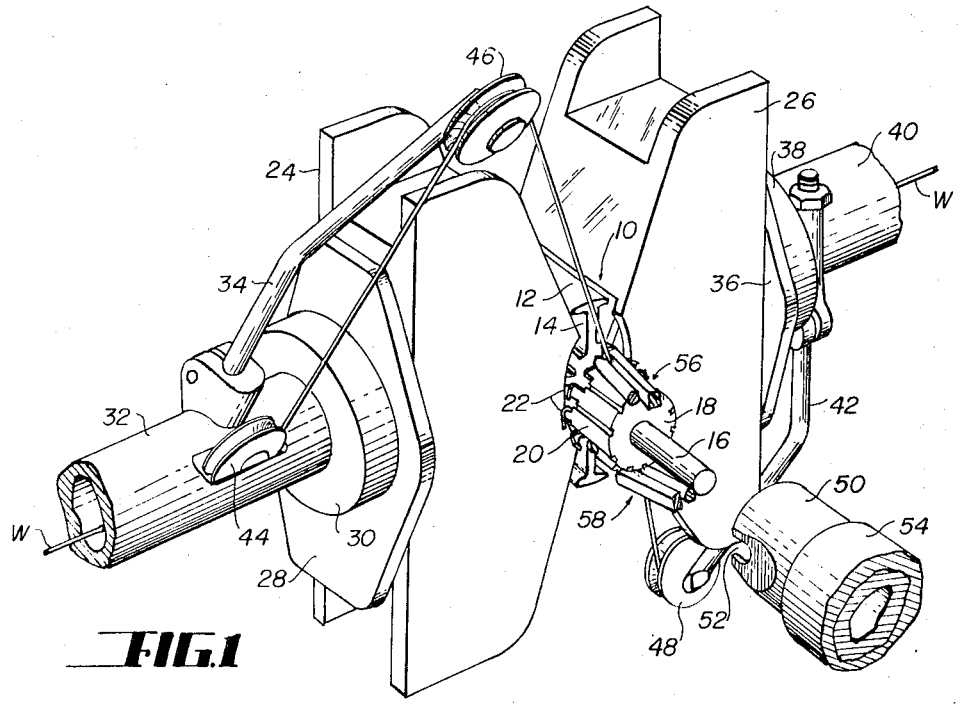
FIG.1
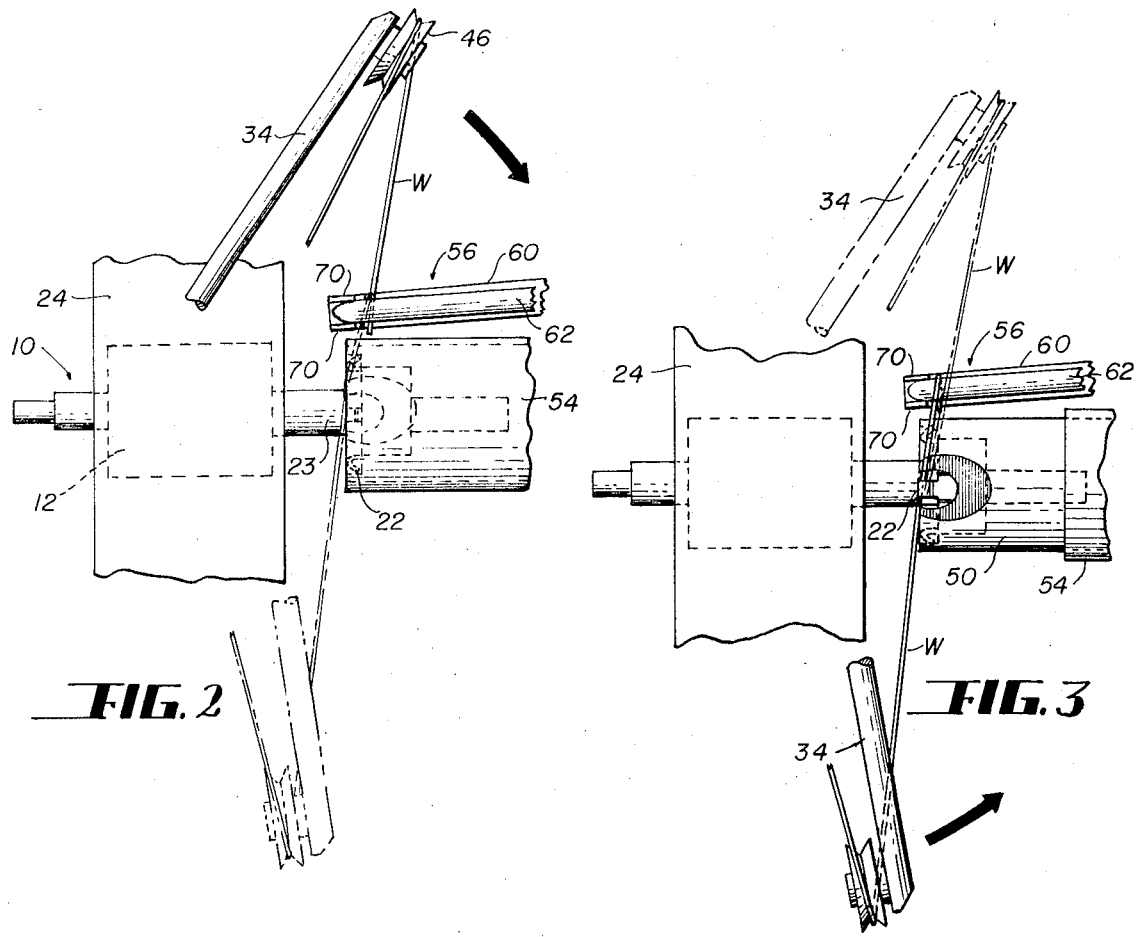
FIG.2
FIG.3

ARMATURE WINDING METHOD AND APPARATUS

BACKGROUND OF THE INVENTION

This invention relates to an armature winding method and machine and more particularly to the severing of start and finish wires of armatures wound by a double flier armature winding machine. As will become apparent, the invention is not necessarily so limited and, for example, can be used in single flier armature winding machines.

The present invention is intended for use in the winding of armatures of the type having an armature core and a commutator mounted in spaced relation on an armature shaft and wherein the commutator is provided with coil lead receiving hooks or tangs. As used herein, the term "start wires" refers to the wire segments leading to the first coils wound by the fliers. The term "finish wires" refers to the wire segments extending from the last coils wound. In double flier armature winding machines having two fliers, there are also two start and two finish wires.

U.S. Pat. No. 3,713,209 granted to John M. Biddison on Jan. 30, 1973, discloses a machine and method utilizing wire clamps which engage the finish wires and cutters operable to cut the finish wires close to the commutator tangs between the clamps and the tangs while the wound armature is still located between the winding forms in the winding machine. The wires are held clamped during the interval in which the wound armature is cut free, removed from the winding machine, and an unwound armature inserted in its place. The aforementioned U.S. Pat. No. 3,713,209 also describes the commencement of the winding of the next armature and a method for serving the clamped wires after the start wires for the unwound armature are connected to the commutator tangs.

Armature lead wires have also been cut by providing notches with cutting edges in the shield device which covers the commutator tangs while the coils are being wound and then locating the wires in the notches and cutting the wires by relatively rotating the notched portion of the shield device. This procudure is satisfactory for many applications. However, it does require a specially notched shield device and the short lengths of wire left extended from the tangs after the wires are cut may be objectionable in some cases, especially where there is a large number of closely spaced tangs. Such procedures can be used with start or finish wires but the extra machine manipulations required to practice the procedure with start wires are objectionable.

Other methods and apparatus have been developed for the purpose of severing start and finish wires. The known methods and apparatus require that cutters and cutter drives be added to the armature winding machine and/or require the use of clamps with fairly complex clamp positioning and operating devices. Moreover, none of the known methods result in severing of both the start and finish wires immediately at the tangs while the armature is still located in the winding machine.

SUMMARY OF THE INVENTION

This invention provides an improved approach to the cutting of the coil lead wires from an armature while it is located in the winding machine. In accordance with this invention both the start and finish wires can be severed by relative movement of wire clamps engaging the wires and the armature being wound. As a result of the relative movement the wires are stressed at the tangs and severed at or quite near the edges of the tangs. Accordingly, there is no excess wire left extending from the tangs and further trimming operations are unnecessary.

When this invention is incorporated in armature winding machines provided with armature rotators such as those described in U.S. Pat. Nos. 3,506,864 issued to Jerry E. Miller on Apr. 14, 1970, and U.S. Pat. No. 3,524,601 issued to John M. Biddison on Aug. 18, 1970, the only additions to the armature winding machines required to practice this invention are the clamps for engaging the wires. Since devices for clamping wire preparatory to severing the wire have already been incorporated into armature winding machines, such as for example described in aforementioned Biddison U.S. Pat. No. 3,713,209, no elaborate or new mechanism is required for the practice of the broad concept of severing the wires against edges of the tangs. When cutting finish wires it is preferred to utilize mechanism all of which could be old. However, when severing the start wires, it is presently preferred to move the wire clamps while holding the armature stationary. Therefore, it is also an object of this invention to provide a novel wire clamp support and actuator mechanism for use in severing the start wires.

Although the method and apparatus as described herein are used for severing both the start and finish wires, those familiar with the art will readily recognize that the method for severing the finish wires described herein could be used with other methods for severing the start wires. Conversely, the method described for severing the start wires could be coupled with other methods for severing the finish wires.

BRIEF DESCRIPTION OF THE DRAWINGS

FIG. 1 is a partially exploded perspective view of a double flier armature winding machine of the type which can be used in the practice of this invention. FIG. 1 also shows an armature located between the winding forms thereof.

FIGS. 2 and 3 are side elevational views of parts of the winding machine and the armature of FIG. 1 illustrating, in sequence, the first steps in the hooking of a start wire about a selected commutator tang.

FIG. 4 also shows by phantom lines the step of severing the start wire. FIG. 4 additionally shows other parts of the armature winding machine and including a novel clamp support and actuator mechanism in accordance with this invention.

DESCRIPTION OF THE PREFERRED EMBODIMENT

Figure 4:
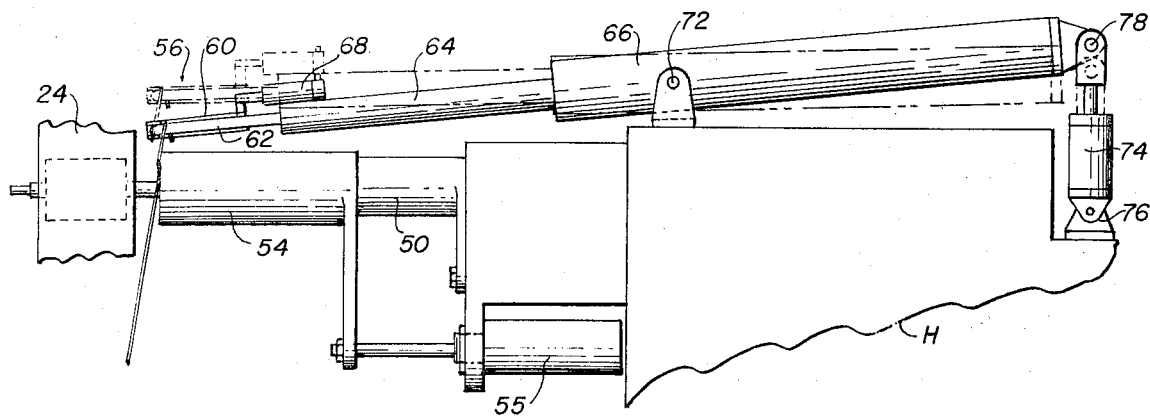
FIG. 4 is a side elevational view showing in lesser detail the parts of the mechine shown in FIGS. 2 and 3 after a further step in the looping of the start wire to the selected tang.

Referring to FIGS. 1 and 2, this invention is concerned with the winding of an armature of the type generally designated 10 including an armature core 12 having radially inwardly directed coil receiving slots 14 mounted on an armature shaft 16. a commutator 18 is mounted upon the same shaft and has a plurality of segments 20 terminating in tangs or hooks 22. The section of the shaft 16 between the core 12 and the commutator 18 is covered by an insulating sleeve 23.

A portion of a double flier winding machine used for winding the armature 10 is shown in FIG. 1 and includes left and right side (as viewed in FIG. 1) wire guide wings or winding forms, designated 24 and 26, respectively, the armature 10 being supported at least partly by the confronting concavely curved surfaces thereof. The left side winding form 24 is mounted upon a mounting plate 28 which in turn is supported on a bearing housing 30 that rotatably receives a flier spindle 32 on which is affixed a flier 34. the right side winding form 26 is similarly mounted on a mounting plate 36 affixed to a bearing housing 38 rotatably receiving a spindle 40 for a flier 42.

As conventional, wire, designated W, is dereeled under tension from a supply spool (not shown) and coursed through the spindle 32 around a pulley 44 mounted for rotation thereon and another pulley 46 mounted for rotation at the terminal end of the flier 34. Another strand of wire W is drawn under tension from another supply spool (not shown) through the spindle 40, around a pulley (not shown) rotatably mounted on the spindle 40 around a pulley 48 on the flier 42. As well known to those skilled in the art, the fliers 34 and 42 may be rotated to wind coils, two at a time, in spaced slots 14 of the core 12. Appropriate machine elements and control devices (not shown) are provided for spreading the winding forms 24 and 26 when an armature is inserted or removed, for rotating the fliers 34 and 42 in proper timed sequence, and for indexing the armature 10 as required to present new pairs of slots in position to receive coils wound by the fliers.

During the intervals in which the fliers 34 and 42 are rotating to wind coils, it is necessary to shield the commutator hooks 22 so that the wires are not accidentally hooked thereover. For this purpose a hollow, cylindrical inner commutator shield 50 is fixed as shown in FIG. 4 to a stationary part of the machine. In use the shield 50 surrounds the commutator 18 and has a pair of opposed notches 52, only one of which is illustrated in FIG. 1, the other being hidden from view. the notches 52 are located at the free end of the shield 50 and, in the disclosed embodiment, are aligned in a generally horizontal plane intersecting the armature shaft 16, thereby exposing the two diametrically opposed tangs 22 located in the generally horizontal plane at what are referred to as the "3 o'clock" and the "9 o'clock" positions. During the winding of coils, the tangs 22 exposed by the notches 52 are covered by a movable, hollow tubular outer commutator shield 54 mounted for sliding movement in surrounding relation to the inner shield 50. When lead wire connections are to be made to a pair of tangs 22, the outer shield 54 is retracted by an air actuator 55 (FIG. 4) to also expose the generally horizontally located hooks 22.

During the winding of coils, the two fliers 34 and 42 rotate in opposite directions as viewed from the front or back of the machine. Thus, with reference to the orientation of parts as viewed in FIG. 1, the left side flier 34 would rotate in a "top coming" direction while at the same time the right side flier 42 rotates in a "top going" direction. The operations of the two fliers 34 and 42 are otherwise identical except in the well known case of the winding of armatures having an odd number of slots.

In FIGS. 1 and 2 the fliers 34 and 42 are shown in the positions they occupy just after the armature 10, as yet unwound, is placed in the winding machine. At this time the free end of the wires W are held adjacent the commutator 18 by upper and lower clamps designated 56 and 58, respectively, which are described in some detail below. The procedures for connecting the start wires to a pair of selected commutator tangs 22 and for severing the start wires will now be discussed in connection with FIGS. 2 through 7. Since the operations of the fliers are essentially identical and the operations of the clamps 56 and 58 are identical, the continued description of the instant invention is made only with reference to the left side flier 34 and its associated wire clamp 56.

The first step is illustrated in FIG. 2. With the outer shield 54 extended toward the core 12 in covering relation to the inner shield 50 and the commutator tangs 22, the flier 34 is rotated in a forward direction, that is, the direction it rotates to wind coils, to extend the wire segments between the clamp 56 and the flier pulley 46 generally across the face of the commutator 18 confronting the core 12. The flier 34 comes to a stop at the position shown in phantom lines in FIG. 2 after rotation thereof in the forward direction through an angle on the order of 100° to 120°. The outer shield 54 is now retracted as shown in FIG. 3 in preparation for the hooking of the wire about the selected tang 22 exposed by the inner shield notch 52 located at approximately the "3 o'clock" position. The flier 34 is then rotated in a reverse direction indicated by the arrow in FIG. 3 to the phantom line position thereof shown in FIG. 3. As a result the wire is hooked around the rear of the exposed tang 22.

After the flier 34 reaches the phantom line position thereof shown in FIG. 3, the outer shield 54 is extended, that is, moved back into covering relation to the inner shield 50 by operation of the air actuator 55. The wire immediately adjacent the previously exposed tang 22 is bent by the leading edge of the outer shield 54 toward the armature core 12, whereupon the wire is further extended about its associated tang 22. The wire is then completely looped about its associated tang 22 by rotation of the flier 34 back to the full line position thereof shown in FIG. 3. The parts have now reached the position illustrated in full lines in FIGS. 4 and 5.

The described method of looping start wires about selected commutator tangs is not new. The looping of the wire about the tang and especially the initial hooking of the wire as illustrated in FIG. 3 may be assisted by wire guides of the type shown in the Bucholtz and Doyle U.S. Pat. No. 3,713,598 granted Jan. 30, 1973. For some applications, especially when the armature is to be wound with relatively fine wire, it may be necessary or desirable to form more than one loop about each selected tang as described in the Doyle U.S. Pat. No. 3,713,208 granted Jan. 30, 1973.

Figure 7:
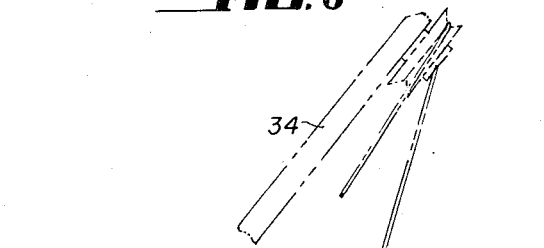
FIG. 7 illustrates in perspective view a portion of the commutator and the start wire connected thereto after the severing of the wire therefrom is completed.
Figure 7:
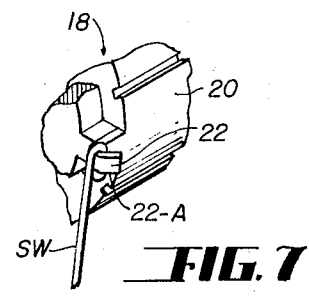

In accordance with this invention, the wire extending from the tang about which the start wire is looped and the wire clamp 56 is severed along an edge of the tang by the simple expedient of relatively moving the tang and the clamp. The segment of wire to be severed away from the tang is designated by the reference character $W_1$ in FIG. 5. It will be noted that the wire segment $W_1$ has a fixed length determined by the spacing between the top of the clamp 56 and the far edge, designated 22-A, of the tang (FIG. 7). The tang edge 22-A normally is relatively sharp or it can be machined to a sufficient sharpness if necessary. As further described below, the jaw 62 of the wire clamp 56, over which the wire segment $W_1$ extends, is rounded. Accordingly, if the wire segment $W_1$ is stretched it will be subject to the greatest stress concentration where it meets the tang edge 22-A and, if sufficiently stretched, will break at the edge 22-a.

Figure 5:
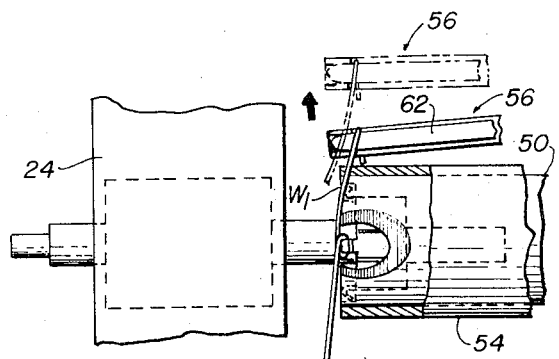
FIG. 5, which is on the third sheet of drawings, is a view similar to FIGS. 2 and 3 but with part broken away and illustrating the step of severing the wire also illustrated in FIG. 4.
Figure 6:
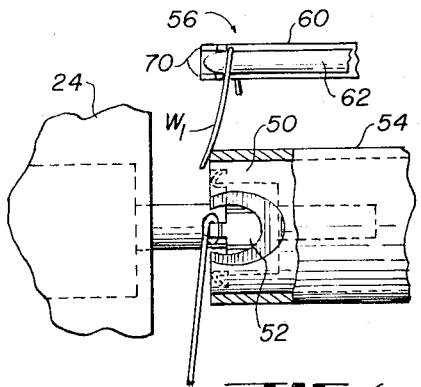
FIG. 6 is a view showing part of the apparatus and the armature shown in FIG. 5 and otherwise similar to FIG. 5 but after the severing of the wire.

Stretching of the wire segment $W_1$ could be accomplished by rotation of the armature 10 in a direction to move the tang 22 about which the wire is looped away from the clamp 56. Such in fact is the basic procedure described below for severing the finish wire. In the embodiment disclosed herein, the machine is designed to normally rotate the armature in the opposite direction, that is, in a direction which would cause the tang 22 to move toward rather than away from the clamp 56. Therefore, the preferred practice in accordance with this invention is to stretch the wire $W_1$ and ultimately break it against the tang edge 22-A, by moving the clamp 56 in a direction essentially perpendicularly away from the tang edge 22-A. FIG. 5 illustrates in full lines the position of the clamp 56 prior to its aforedescribed movement away from the tang edge 22-A. FIG. 5 also illustrates in phantom lines the position of the clamp after it is moved away from the tang edge 22-A. note in FIG. 5 that the wire segment $W_1$ has been broken at the tang edge 22-A. This condition is also illustrated in the same manner in FIG. 4 and the position of the parts after the breaking of the wire segment $W_1$ is also shown in FIG. 6. Following the breaking away of the wire segment $W_1$, the start wire, labeled SW, remains looped about the tang 22 as shown in FIG. 7.

The clamp 56 may consist of a pair of clamp jaws, a relatively fixed jaw 60 and a relatively movable jaw 62. The fixed jaw 60 is affixed in any suitable fashion to a piston rod 64 of an air actuator 66 and the movable jaw 62 is shown connected to the piston of an air actuator 68 mounted on the piston rod 64. in operation to clamp the wire, the relatively fixed jaw 60 is first moved adjacent the wire by energization of the air actuator 66. The relatively movable jaw 62 is then moved adjacent the wire by energization of the air actuator 68. The forward end of the relatively fixed jaw 60 has suitable flanges 70 extending therefrom over which the wire is cammed as the relatively fixed jaw 60 is moved adjacent the wire. The front or leading end of the relatively movable jaw 62 is beveled so as to gradually come into clamping engagement with the wire adjacent the flanges 70. Those familiar with the art will appreciate that the disclosed apparatus for moving the jaw 62 relative to the jaw 60 including the air actuator 68 would normally be incorporated within a common housing and that the apparatus as disclosed is a simplified representation of clamps which are commercially available. Also, other types of clamps, such as those with pivoted, plier-like jaws, could be used. In any case, the clamp 58 is preferably constructed and actuated identically to the clamp 56.

For purposes of this invention, the primary support for the clamp 56, which in the disclosed embodiment is the air actuator 66, is mounted for pivotal movement on a stationary part of the machine, such as the housing H in FIG. 4, as by a clevis 72. Also, means is provided for positively pivoting the support or actuator 66. The preferred means for pivoting the actuator 66 consists of an air actuator 74 pivotally mounted by a clevis 76 to the machine and also pivotally connected at 78 to the rearward end of the actuator 66. The axis of pivotal movement of the acutator 66 provided by the clevis 72 is approximately parallel to the tang edge 22-A. As apparent, the air actuator 74 can be energized to retract its piston and thereby pivot the actuator 66 about the aforementioned axis, whereupon the clamp 56 is moved generally perpendicularly away from the tang edge 22-A to cause the wire segment $W_1$ to break against the tang edge 22-A.

In some cases it has been observed that, when the wire segment $W_1$ is first stretched during the initial movement of the clamp 56 away from the tang 22, the portion of the wire segment immediately adjacent the tang edge 22-A wedges between the tang and the body of the commutator 18. In such case the wire may not break precisely at the tang edge but may break along the part thereof wedged to the commutator body. In any event, the clamped wire segments broken at the tang by the process described above are broken off so close to the tank that further trimming of the start wire is unnecessary even when there are large numbers of closely spaced tangs.

After the severing of the start wires as described above the winding of the armature can then proceed in the normal fashion. The presence of the wire clamps 56 and 58 does not interfere with the winding of the armature. However, at approximately the same time that the winding of the first pair of coils is begun, the clamp 56 is preferably retracted away from the winding area and the wire segment $W_1$ released therefrom by relative movement of the clamp jaws 60 and 62. The continued winding of the armature can proceed in any conventional fashion and is therefore not described herein. After the winding of the last pair of coils by the fliers, the finish wires are preferably hooked to the selected tangs 22 and the armature cut free following the procedures described below. Again because the operation of the two fliers is essentially identical, being merely opposite in direction, the description is of the left side flier 34 only.

First it should be observed in FIGS. 8–13 that the armature 10 would more properly be illustrated with the several coils wound by the fliers and with lead wire connections between each of the coils and the tangs 22. However, all of the lead wire connections between coils have been omitted in order to better show the finish wire connection to the tang. As well understood, the tangs to which the finish wires are connected are the same tangs to which the start wires are connected. Further to avoid a confusion of lines, the start wires are not shown in FIGS. 8–13.

Figure 9:
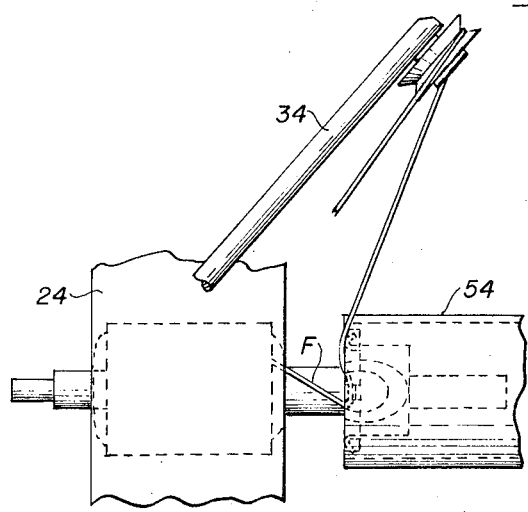
FIGS. 9 and 10, which are on the second sheet of drawings, are views similar to FIG. 8 illustrating additional steps preparatory to the cutting of the finish wire.
Figure 10:
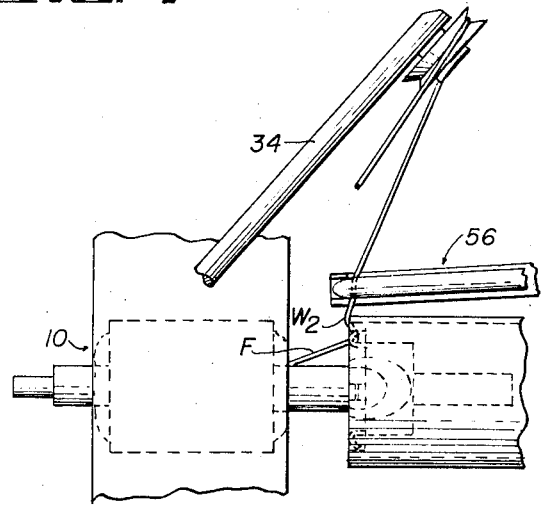
Figure 8:
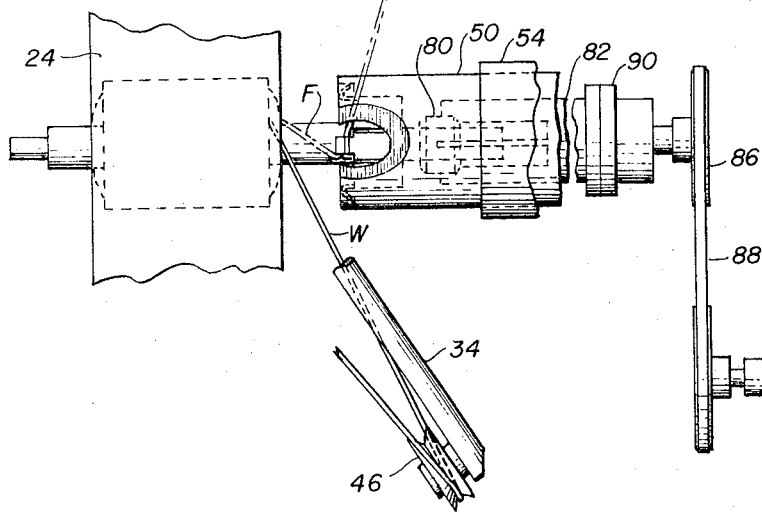
FIG. 8 is a view similar to FIGS. 2 and 3 but illustrating the initial step in the hooking of a finish wire about a selected commutator tang and further illustrating a simplified schematic representation of an armature rotator forming part of the winding machine.

In FIG. 8, the flier 34 is shown by full lines in the position it occupies at the end of the winding of the last coil. To accomplish the hooking of the finish wire designated F, the outer shield 54 is retracted, thereby exposing the selected tangs 22, and the flier 34 moved in a reverse or counterclockwise direction through a partial revolution substantially into its original start position as shown by broken lines in FIG. 8. Thereafter, as shown in FIG. 9, the outer shield 54 is extended by the actuator 55 back into covering relation to the commutator 18 and the notched end of the inner shield 48. This method of hooking the finish wire F is the same as commonly used for making other lead wire connections. The selected tangs 22 receiving the finish wires are again shown located at approximately the 3 and 9 o'clock positions. In accordance with this invention, the armature is rotated after the finish wires are hooked to bring the selected tangs 22 essentially to vertical, i.e. the 12 and 6 o'clock positions. The rotated position of the armature 10 is illustrated in FIG. 10 wherein only the wire which has been rotated from approximately the 3 to the 12 o'clock position is shown. A comparison of FIGS. 9 and 10 reveals that the length of wire between the finish wire receiving tang 22 and the left flier 34 is shortened. However, the reduction in length is slight and the wire remains adequately taut because of the operation of the conventional wire dereeling mechanism (not shown) associated with the wire supply (not shown).

Armature rotating mechanism suitable for the purpose of this invention could include the mechanism otherwise utilized to rotate the armature between the winding of coils. Such mechanism preferably includes a collet located within the inner shield 50 which grips the armature shaft 16. Mechanism suitable for this purpose is shown, for example, in the aforementioned Biddison et al. U.S. Pat. No. 3,524,601. Such mechanism is schematically illustrated in FIG. 8 as including a collet 80 rotated by a collet shaft 82 in turn driven by a drive system including a motor 84 and a pulley 86 driven by a belt 88. As more fully describe in the aforementioned Biddison et al. U.S. Pat. No. 3,524,601, the pulley 86 may be connected to the shaft 82 through a clutch mechanism 90. The operation of the motor 84 is controlled synchronously with the other machine operations through conventional motor control circuitry represented schematically by the box 92.

Figure 11:
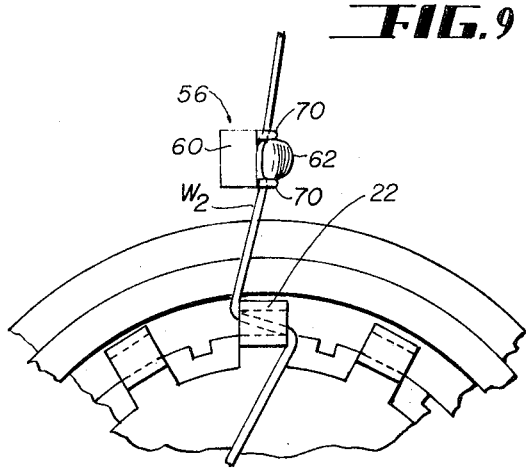
FIG. 11 is an elevational view of a portion of the commutator and parts of the armature winding machine illustrating the relationship of the finish wire tang to the finish wire in the position of the parts also illustrated in FIG. 10.

After the armature has been rotated into the position shown in FIG. 10, the wire segment between the flier pulley 46 and the selected tang 22 is gripped by the wire clamp 56 as illustrated in FIGS. 10 and 11. Accordingly, there is established a wire segment designated $W_2$ of fixed length which can be broken against an edge of the tang 22 by relative movement of the armature 10 and the clamp 56. In the case of the wire segment $W_2$, it can most easily be broken by rotating the armature while the clamp 56 remains stationary. Such rotation can be seen from a comparison of FIGS. 11 and 12.

Figure 12:
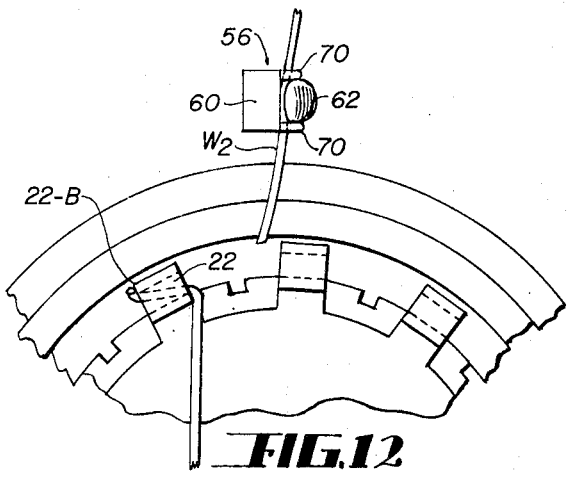
FIG. 12 is a view similar to FIG. 11 illustrating the parts after the finish wire has been cut.
Figure 13:
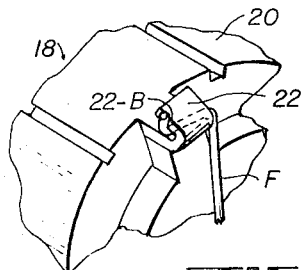
FIG. 13 is a perspective view of a portion of the commutator and the finish wire after it has been severed free from the flier.

In FIGS. 12 and 13 it will be observed that the wire segment $W_2$ extending from the finish wire F has been subjected to a stress concentration at the edge 22-B of the tang 22, the stress being caused in part by the severe bending of the wire at this edge as the armature is rotated. It will also be observed that the direction of armature rotation remains constant throughout. That is, the armature is rotated in the same direction after it reaches the position shown in FIG. 11 as the armature was rotated between FIGS. 9 and 10. As with the start wire, the finish wire is cut at the tang and no further trimming away of the wire is needed. Since the finish wire F is further bent around the tang as the armature is being rotated, it has been found that the wire grips the tang 22 sufficiently to maintain it engaged with the tang 22 until the wire is permanently secured to the tang, such as is usually done by hot staking.

As already mentioned, in the case of the armature 10 illustrated in the drawing, the finish wires associated with both fliers are cut at the same time. The armature is thus cut free from the fliers and it can then be removed from the winding machine. The clamps 56 and 58 and the fliers 34 and 42 are located in the same position after the finish wires are cut as they are located to commence the previously described looping of the start wires to an unwound armature. Therefore, these parts need not be repositioned during the interval in which the wound armature is removed from the machine and an unwound armature inserted in its place. The steps described above can thus be repeatedly carried out on successive armatures.

Those familiar with armature winding machines will appreciate that the procedures described above are subject to minor variations to meet specific armature winding requirements. For example, the notches 50 are frequently located so as to expose tangs several degrees away from horizontal. Therefore, it is to be understood that the term horizontal as used herein is merely used for purposes of reference and not as an essential for the practice of the invention. When winding armatures having an even number of slots, the tangs to which the two start and the two finish wires are connected are conventionally diametrically opposed. Such need not invariably be the case.

Armatures having an odd number of slots present a special case. Conventional odd-slot armatures do not have diametrically opposed tangs and are wound with an odd number of coils. It is common practice to wind as many coils as possible two at a time and wind the extra, odd coil by itself, either as the first coil wound or the last coil wound. In such event, both start wires and both finish wires could not be simultaneously severed. When using the invention described herein for the winding of odd-slot armatures, the preferred practice is to wind the coils two at a time after the start wire connections are simultaneously made and the start wires severed. If, for example, the left side flier is utilized to wind the extra coil, the above procedure for connecting and severing the finish wire to its associated tang 22 is practiced only in connection with the right side flier. Immediately thereafter, the last coil is wound by the left side flier and the steps of connecting and severing the finish wire associated with the left side flier are undertaken. the wound armature can then be removed and replaced by an unwound armature with the clamps and fliers already in position to commence the winding of a succeeding armature.

In every case the severing of the wires at the tangs occurs partly as a result of the bending of the wire segments leading to the clamps about edges of the tangs. The relative movements of the clamps and the armatures which first cause the wire segments to be stretched also cause the portions of the wires bent or looped around the tangs to be more tightly engaged with the tangs. In practically every case the wire, as observed from the flier, is broken at the tang edge about which it is first bent. In the particular case illustrated in the drawings, and especially FIG. 12, the length of the severed wire segment gripped by the clamp 56 is at a minimum because the tang 22 about which the finish wire is hooked is as close to the clamp 56 as possible. The scrap wire left after subsequently cutting the next start wire is therefore kept to a minimum. However, it may be desirable in some cases to rotate the armature through a much greater angle than that illustrated before it is gripped by the clamp 56. For example, the armature could be rotated beginning with FIG. 9 through an angle in excess of 180° before the wire segment is clamped. Accordingly, the tang 22 at the 12 o'clock position in FIG. 11 would instead be located at 7 or 8 o'clock at the time the wire segment leading from the tang is gripped. Continued rotation of the armature would still cause the wire to be broken at the tang edge 22-B. The desired degree of angular rotation in each case can best be determined by trial and error.

The procedures described above for severing the start and finish wires are best suited for use with relatively fine wires but can be used with most medium sized wires used in the winding of universal armatures. Whenever possible, the procedures described above are used for severing the start and finish wires. In some cases the type of wire used or the design of the commutator tangs or other variables may make it undesirable or even impossible to, for example, follow the described procedure for severing the finish wires yet render it possible to follow the procedures for severing the start wires. In such event other methods and apparatus may be used for cutting the finish wires. alternatively, other methods may be used when needed for severing the start wires and the above described procedures used only for severing the finish wires.

Although the presently preferred embodiment of this invention has been described it will be understood that within the purview of this invention various changes may be made within the scope of the appended claims.

Having thus described our invention, we claim:

1. In an armature winding machine of the type having wire clamp means for clamping a stretch of wire between a wire guiding flier and a commutator tang around which said wire is bent, the improvement comprising actuating means for causing said wire clamp to grip said stretch of wire, and drive means for moving said wire clamp means away from said tang in a direction generally perpendicular to the edge of said tang around which wire leading from said flier is first bent thereby to sever said stretch of wire against said edge of said tang.

2. The apparatus of claim 1 wherein said clamp means is pivotally mounted to said armature winding machine and said drive means includes means for rotating said clamp means about said pivot.

3. In a method of machine winding an armature of the type having a commutator with wire lead receiving tangs utilizing a flier type armature winder, the method being of the type wherein there is a wire segment gripped by a clamp and engaging a commutator tang, the improvement comprising the severing of said wire segment at said tang by relatively moving said clamp and said armature to stretch said wire segment.

4. The improvement of claim 3 wherein the direction of movement of said clamp relative to said armature causes said wire to be severed at the first edge of said tang engaged by the wire segment leading from said clamp.

5. In a method of machine winding an armature of the type having a commutator with lead receiving tangs utilizing a flier type armature winding machine, the improvement comprising the steps of:
  1. clamping the wire extending from the flier by a clamp,
  2. locating the armature in the winding machine with a selected tang in a position to receive a start wire,
  3. rotating the flier as required to loop the wire about said selected tang whereupon a wire segment extends from the clamped portion thereof to the selected tang, and
  4. severing said wire segment at said selected tang by relatively moving said clamp and said armature to stretch said wire segment.

6. The improved method of claim 5 wherein said relative movement of said clamp and said armature is achieved by moving said clamp in a direction generally perpendicularly away from the first edge of said tang around which the wire segment leading from said clamp is bent.

7. In a method of machine winding armatures utilizing a flier type armature winder of the type wherein the wire leading from a flier is clamped by clamp means and the start wire for an unwound armature is looped about a commutator tang, the improved method for severing the clamped wire portion from the wire portion looped about the tang including the step of moving the clamp means away from the commutator whereby the wire segment between the clamp means and the tang is severed against an edge of the tang.

8. In a method of machine winding aramtures of the type having a commutator with lead receiving tangs utilizing a flier type armature winding machine, the improvement comprising the steps of engaging the length of wire extending from the last coil wound about a selected commutator tang, gripping said wire by a clamp and relatively moving said wire and said armature whereby the segment of wire between said clamp and said selected tang is severed at said tang.

9. In a method of machine winding armatures of the type having a slotted armature core and a commutator mounted on a common armature shaft and wire lead receiving tangs projecting from the commutator, coils of wire being formed in slots of said core by rotation of a flier and wire leads extending from said coils being automatically connected to said tangs, the length of wire extending from the last coil wound being hooked about a selected tang, the improved method for severing the wire between said selected tang and the flier including the steps of clamping the length of wire extending from said tang to said flier by a clamp, and rotating said armature in a direction to bend the wire segment about an edge of said selected tang whereupon the wire segment between said clamp and said tang is severed against said edge of said selected tang.

10. For use in an armature winding machine of the type having a flier for forming coils into slots of an armature core and connecting coil leads about commutator tangs projecting from a commutator mounted on a common shaft with said core, a method of severing a finish wire projecting from a wound armature and a start wire leading toward the next armature to be wound comprising the steps of:
 1. at the termination of the winding of the last coil by a flier in a wound armature, hooking the wire extending from said coil about a preselected commutator tang,
 2. engaging the wire between said tang and said flier by a clamp, pl 3. relatively moving said clamp and said armature while retaining clamping engagement of said wire to stretch the wire segment between said tang and said clamp thereby severing said wire at said tang,
 4. removing said wound armature from the winding machine,
 5. inserting an unwound armature into said winding machine,
 6. looping wire leading from said clamp to said flier around a preselected tang of said unwound armature, and
 7. relatively moving said clamp and said unwound armature to sever the wire segment between said clamp and said last mentioned tang at said last mentioned tang.

11. The method of claim 10 wherein said clamp and said armature are first relatively moved (step 3) by movement of said clamp in a direction generally perpendicular to the edge of said tang around which said wire segment leading from said clamp is first bent whereby said wire segment is severed at said edge.

12. The method of claim 11 wherein said clamp and said armature are relatively moved the second time (step 7) by rotation of said armature.

* * * * *

UNITED STATES PATENT OFFICE
CERTIFICATE OF CORRECTION

Patent No. 3,812,577  Dated May 28, 1974

Inventor(s) Jerry L. Compton and David R. Seltz

It is certified that error appears in the above-identified patent and that said Letters Patent are hereby corrected as shown below:

Col. 1, line 36, change "serving" to ---severing---.
Col. 1, line 44, change "procudure" to ---procedure---.
Col. 2, line 11, change "Nos." to ---No.---.
Col. 3, line 27, change "a" to ---A---.
Col. 3, line 41, change "the" to ---The---.
Col. 4, line 4, change "the" (second occurrence) to ---The---.
Col. 4, line 54, change "120°" to ---160°---.
Col. 5, line 37, change "22-a" to ---22-A---.
Col. 5, line 56, change "note" to ---Note---.
Col. 6, line 1, change "in" to ---In---.
Col. 6, line 50, change "tank" to ---tang---.
Col. 9, line 3, change "the" to ---The---.
Col. 9, line 47, change "alternatively" to ---Alternatively---.
Col. 10, line 25, delete "a" (second occurrence)
Col. 11, line 21, delete "pl".
Col. 12, line 1, insert a comma after "clamp".

Signed and sealed this 5th day of November 1974.

(SEAL)
Attest:

McCOY M. GIBSON JR.
Attesting Officer

C. MARSHALL DANN
Commissioner of Patents